United States Patent
Chen et al.

(10) Patent No.: US 11,551,066 B2
(45) Date of Patent: Jan. 10, 2023

(54) DEEP NEURAL NETWORKS (DNN) HARDWARE ACCELERATOR AND OPERATION METHOD THEREOF

(71) Applicant: INDUSTRIAL TECHNOLOGY RESEARCH INSTITUTE, Hsinchu (TW)

(72) Inventors: Yao-Hua Chen, Fangyuan Township (TW); Chun-Chen Chen, Yuanli Township (TW); Chih-Tsun Huang, Hsinchu (TW); Jing-Jia Liou, Hsinchu (TW); Chun-Hung Lai, Taichung (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1032 days.

(21) Appl. No.: 16/248,042

(22) Filed: Jan. 15, 2019

(65) Prior Publication Data
US 2020/0193275 A1    Jun. 18, 2020

(30) Foreign Application Priority Data

Dec. 12, 2018   (TW) ................................. 107144665

(51) Int. Cl.
*G06F 3/06*       (2006.01)
*G06N 3/063*      (2006.01)
(Continued)

(52) U.S. Cl.
CPC ......... *G06N 3/063* (2013.01); *G06F 9/30101* (2013.01); *G06F 13/4208* (2013.01)

(58) Field of Classification Search
None
See application file for complete search history.

(56) References Cited

U.S. PATENT DOCUMENTS

| | | | |
|---|---|---|---|
| 7,898,947 B2 * | 3/2011 | Briscoe | ............... H04L 41/0896 370/468 |
| 9,710,748 B2 | 7/2017 | Ross et al. | |

(Continued)

FOREIGN PATENT DOCUMENTS

| | | |
|---|---|---|
| CN | 100469072 C | 3/2009 |
| CN | 106228238 A | 12/2016 |

(Continued)

OTHER PUBLICATIONS

Chen et al., "Eyeriss: An Energy-Efficient Reconfigurable Accelerator for Deep Convolutional Neural Networks", IEEE Journal of Solid-State Circuits, Jan. 2017, vol. 52, No. 1, pp. 127-138.

(Continued)

*Primary Examiner* — Hyun Nam
(74) *Attorney, Agent, or Firm* — Birch, Stewart, Kolasch & Birch, LLP (57) ABSTRACT

A DNN hardware accelerator and an operation method of the DNN hardware accelerator are provided. The DNN hardware accelerator includes: a network distributor for receiving an input data and distributing respective bandwidth of a plurality of data types of a target data amount based on a plurality of bandwidth ratios of the target data amount; and a processing element array coupled to the network distributor, for communicating data of the data types of the target data amount between the network distributor based on the distributed bandwidth of the data types.

24 Claims, 7 Drawing Sheets

(51) Int. Cl.
G06F 13/42 (2006.01)
G06F 9/30 (2018.01)

(56) References Cited

U.S. PATENT DOCUMENTS

| | | | |
|---|---|---|---|
| 9,747,546 B2 | 8/2017 | Ross et al. | |
| 9,860,796 B2* | 1/2018 | Bostick | H04W 36/26 |
| 2006/0095656 A1* | 5/2006 | Ueoka | H04L 67/1097 |
| | | | 711/111 |
| 2013/0135523 A1* | 5/2013 | Ramalho | H04N 21/2385 |
| | | | 348/E7.003 |
| 2014/0181472 A1* | 6/2014 | Krig | G06F 1/3206 |
| | | | 712/201 |
| 2015/0326481 A1* | 11/2015 | Rector | H04L 47/2416 |
| | | | 370/236 |
| 2016/0094450 A1* | 3/2016 | Ghanwani | H04L 43/0894 |
| | | | 370/235 |
| 2016/0379109 A1 | 12/2016 | Chung et al. | |
| 2017/0094296 A1* | 3/2017 | Gu | H04N 19/105 |
| 2017/0308317 A1* | 10/2017 | Kodama | G06F 11/34 |
| 2017/0330069 A1* | 11/2017 | Liu | G06N 3/063 |
| 2018/0032859 A1 | 2/2018 | Park et al. | |
| 2018/0046900 A1 | 2/2018 | Dally et al. | |
| 2018/0046906 A1 | 2/2018 | Dally et al. | |
| 2018/0046916 A1 | 2/2018 | Dally et al. | |
| 2018/0173676 A1* | 6/2018 | Tsai | G06F 17/15 |
| 2018/0227349 A1* | 8/2018 | Annamraju | H04L 43/16 |
| 2018/0314671 A1* | 11/2018 | Zhang | G06N 3/063 |
| 2018/0330238 A1 | 11/2018 | Luciw et al. | |
| 2018/0373975 A1* | 12/2018 | Yu | G06N 3/08 |
| 2019/0205745 A1* | 7/2019 | Sridharan | G06N 3/08 |
| 2020/0193275 A1* | 6/2020 | Chen | G06N 3/063 |
| 2021/0201118 A1* | 7/2021 | Chen | G06N 3/063 |
| 2022/0124622 A1* | 4/2022 | Islam | H04W 72/0406 |

FOREIGN PATENT DOCUMENTS

| | | |
|---|---|---|
| TW | I616813 B | 3/2018 |
| TW | 201822076 A | 6/2018 |
| WO | WO 2017/185386 A1 | 11/2017 |

OTHER PUBLICATIONS

Han et al., "EIE: Efficient Inference Engine on Compressed Deep Neural Network", 2016 ACM/IEEE 43rd Annual International Symposium on Computer Architecture, 2016, pp. 243-254.

Jouppi et al., "In-Datacenter Performance Analysis of a Tensor Processing Unit", ISCA'17, Toronto, ON, Canada, Jun. 24-28, 2017, total 12 pages.

Kim et al., "A Novel Zero Weight/Activation-Aware Hardware Architecture of Convolutional Neural Network", Design, Automation and Test in Europe (DATE), 2017, pp. 1462-1467.

Lee et al., "UNPU: A 50.6TOPS/W Unified Deep Neural Network Accelerator with 1b-to-16b Fully-Variable Weight Bit-Precision", ISSCC, 2018, Session 13 / Machine Learning and Signal Processing / 13.3, total 3 pages.

Parashar et al., "SCNN: An Accelerator for Compressed-sparse Convolutional Neural Networks", 2017, total 12 pages.

Shin et al., "DNPU: An 8.1TOPS/W Reconfigurable CNN-RNN Processor for General-Purpose Deep Neural Networks", ISSCC, 2017, Session 14 / Deep-Learning Processors / 14.2, total 3 pages.

Zhang et al., "Optimizing FPGA-based Accelerator Design for Deep Convolutional Neural Networks", FPGA'15, Monterey, California, USA, Feb. 22-24, 2015, total 10 pages.

* cited by examiner

DEEP NEURAL NETWORKS (DNN) HARDWARE ACCELERATOR AND OPERATION METHOD THEREOF

This application claims the benefit of Taiwan application Serial No. 107144665, filed on Dec. 12, 2018, the disclosure of which is incorporated by reference herein in its entirety.

TECHNICAL FIELD

The disclosure relates to a deep neural network (DNN) hardware accelerator and an operation method thereof.

BACKGROUND

A deep neural networks (DNN) is a link of an artificial neural network (ANN), and can be used for deep machine learning. Artificial neural networks can have a learning function. Deep neural networks have been used for resolving various problems, for example, machine visual and voice recognition.

It is one goal of the industry to optimize an internal data transmission speed in a deep neural network to further accelerate a processing speed thereof.

SUMMARY

According to one embodiment the present application, a deep neural network hardware accelerator provided includes: a network distributor, receiving input data, allocating individual bandwidths for a plurality of data types of a target data size according to a plurality of bandwidth proportions of the target data size; and a processing element array, coupled to the network distributor, communicating respective data of the data types of the target data size with the network distributor according to the individual bandwidths allocated for the data types.

According to another embodiment of the present application, an operation method for a deep neural network hardware accelerator is provided, wherein the deep neural network hardware accelerator includes a network distributor and a processing element array, and the processing element array includes a plurality of processing elements. The operation method includes: analyzing a target data size; configuring a plurality of bandwidth proportions for a plurality of data types of the target data size according to an analysis result of the target data size; determining, according to a delay caused in association with the bandwidth proportions of the data types of the target data size, whether to reconfigure the bandwidth proportions of the data types of the target data size; initializing the network distributor and the processing elements of the processing element array according to the bandwidth proportions of the data types of the target data size; and processing input data by at least one selected processing element of the processing element array.

According to an alternative embodiment of the present application, a deep neural network hardware accelerator provided includes: a bandwidth and utilization analysis unit, analyzing a target data size to obtain a distribution situation of a plurality of data types of the target data size and configuring individual transmission bandwidths for the data types of the target data size; a processing element array, including a plurality of processing elements; a plurality of first multiplexers, coupled to the processing element array, the first multiplexers receiving first data and second data of input data; and a controller, coupled to the bandwidth and utilization analysis unit and the first multiplexers, the controller controlling the first multiplexers according to the transmission bandwidths configured for the data types by the bandwidth and utilization analysis unit; wherein, a multiplexer among the first multiplexers outputs one having a smaller data size between the first data and the second data of the input data to the processing element array, and another of the first multiplexers outputs one having a larger data size between the first data and the second data of the input data to the processing element array.

According to yet another embodiment of the present application, an operation method for a deep neural network hardware accelerator is provided, wherein the deep neural network hardware accelerator includes a processing element array and a network distributor. The operation method includes: receiving input data, and allocating individual bandwidths for a plurality of data types of a target data size according to a plurality of bandwidth proportions of the target data size; and communicating respective data of the data types of the target data size between the processing element array and the network distributor according to the individual bandwidths allocated for the data types.

DETAILED DESCRIPTION

Technical terms of the application are based on general definition in the technical field of the application. If the application describes or explains one or some terms, definition of the terms are based on the description or explanation of the application. Each of the disclosed embodiments has one or more technical features. In possible implementation, one skilled person in the art would selectively implement part or all technical features of any embodiment of the application or selectively combine part or all technical features of the embodiments of the application based on the disclosure of the application and his/her own need.

Figure 1:
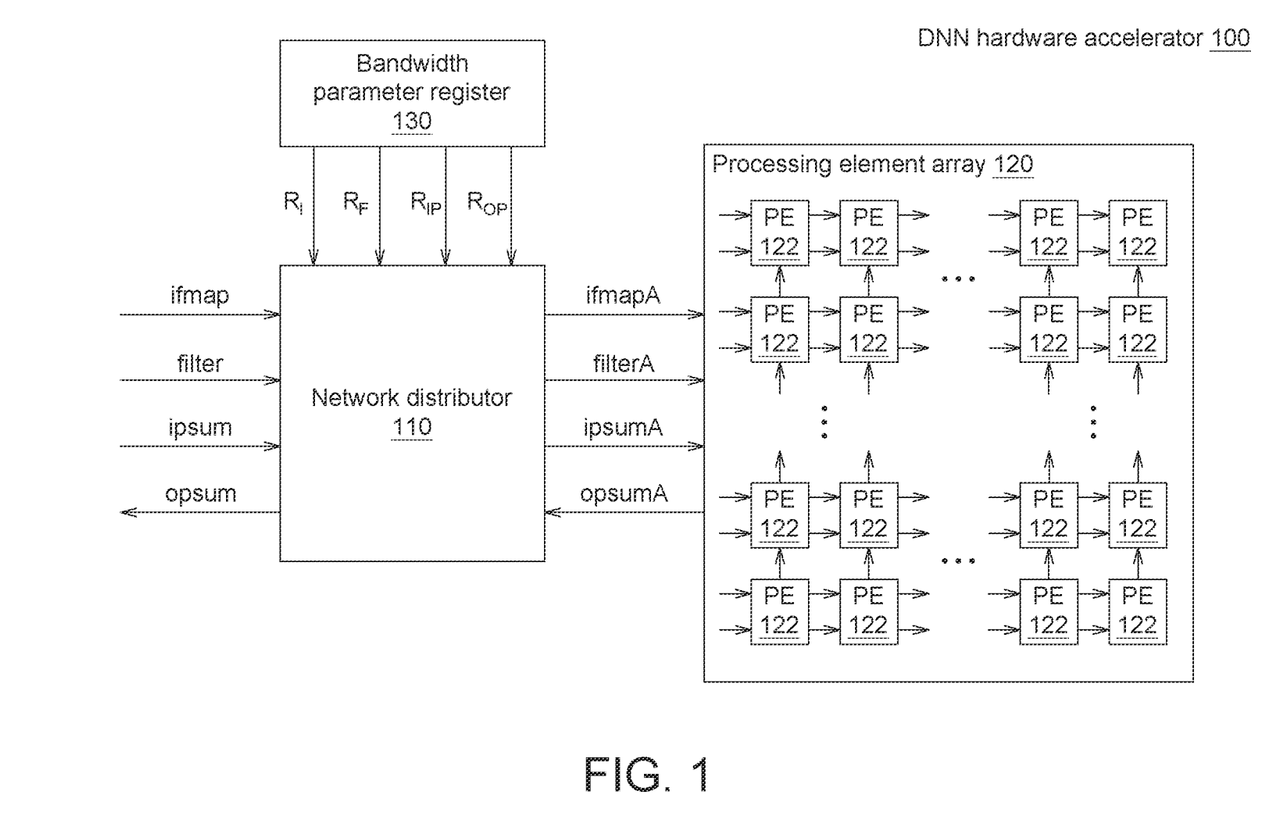
FIG. 1 is a function block diagram of a deep neural network (DNN) hardware accelerator according to an embodiment of the present application.

FIG. 1 shows a function block diagram of a deep neural network (DNN) hardware accelerator according to an embodiment of the present application. As shown in FIG. 1, the DNN hardware accelerator 100 includes a network distributor 110 and a processing element (PE) array 120.

In one embodiment of the disclosure, the network distributor 110 can be hardware, firmware, or software or machine-executable program codes stored in a memory and can be loaded and executed by a microprocessor or a digital signal processor (DSP). If the network distributor 110 is implemented by hardware, the network distributor 110 can be achieved by one single integrated circuit chip, or may be completed by multiple circuit chips; however, the disclosure is not limited thereto. The multiple circuit chips or single integrated circuit chip above can be implemented by an application-specific integrated circuit (ASIC) or a field-programmable gate array (FPGA). The memory above can be a random access memory (RAM), a read-only memory (ROM) or a flash memory. The processing element 122 of the processing element array 120 can be implemented as a microcontroller, a microprocessor, a processor, a central processing unit (CPU), a DSP, an ASIC, a digital logical circuit, an FPGA and/or other hardware elements having operation and processing functions. The processing elements 122 can be coupled to one another by an ASIC, a digital logical circuit, an FPGA and/or other hardware elements.

The network distributor 110 allocates respective bandwidths for a plurality of data types according to a plurality of bandwidth proportions ($R_I$, $R_F$, $R_{IP}$, and $R_{OP}$) of a target data size. In one embodiment, after having processed "the target data size", the DNN hardware accelerator 100 can perform bandwidth adjustment. Herein, "the target data size" is, for example but not limited to, a plurality of data layers, at least one data layer or a configured data size. In the description below, "the target data size" is exemplified by a plurality of data layers or at least one data layer for illustration purposes; however, the present application is not limited to the above example. The data layers are, for example, convolutional layers, pool layers and/or fully-connect layers. The data types include input feature maps (ifmap), filters, input partial sums (ipsum) and output partial sums (opsum). In one embodiment, each data layer includes any combinations of the above data types. For the data layers, the combination proportions thereof are different; that is, for one data layer, the data ifmap can occupy a higher proportion (e.g., having a larger data size), however for another data layer, the data filter can occupy a higher proportion. Therefore, in one embodiment of the present application, the bandwidth proportions ($R_I$, $R_F$, $R_{IP}$, and/or $R_{OP}$) of the data types can be determined with respect to proportions occupied by the data of the data layers, so as to further adjust and/or allocate the respective transmission bandwidths (e.g., bandwidths between the processing element array 120 and the network distributor 110) for the data types. The data proportions $R_I$, $R_F$, $R_{IP}$, and $R_{OP}$ respectively represent bandwidth proportions of the data ifmap, filter, ipsum and opsum, and the network distributor 110 can allocate bandwidths for the data ifmapA, filterA, ipsumA and opsumA according to the bandwidth proportions $R_I$, $R_F$, $R_{IP}$, and $R_{OP}$.

The processing element array 120 includes a plurality of processing elements 122 arranged in an array, and is coupled to the network distributor 110. According to the respective bandwidths allocated for the data types, respective data of the data types is communicated between the processing element array 120 and the network distributor 110.

In one embodiment of the present application, the DNN hardware accelerator 100 further optionally includes a bandwidth parameter register 130. The bandwidth parameter register 130, coupled to the network distributor 110, stores the bandwidth proportions $R_I$, $R_F$, $R_{IP}$, and/or $R_{OP}$ of the data layers, and sends the bandwidth proportions $R_I$, $R_F$, $R_{IP}$, and/or $R_{OP}$ of the data layers to the network distributor 110. The bandwidth proportions $R_I$, $R_F$, $R_{IP}$, and/or $R_{OP}$ stored in the bandwidth parameter register 130 can be obtained by offline training.

In one embodiment of the present application, the bandwidth proportions $R_I$, $R_F$, $R_{IP}$, and/or $R_{OP}$ of the data layers can be obtained real-time. For example, the bandwidth proportions $R_I$, $R_F$, $R_{IP}$, and/or $R_{OP}$ of the data layers are obtained from dynamically analyzing the data layers by a microprocessor (not shown) and sent to the network distributor 110. In one embodiment, if a microprocessor (not shown) dynamically generates the bandwidth proportions $R_I$, $R_F$, $R_{IP}$, and/or $R_{OP}$, offline training for the bandwidth proportions $R_I$, $R_F$, $R_{IP}$, and/or $R_{OP}$ is not required.

Figure 2:
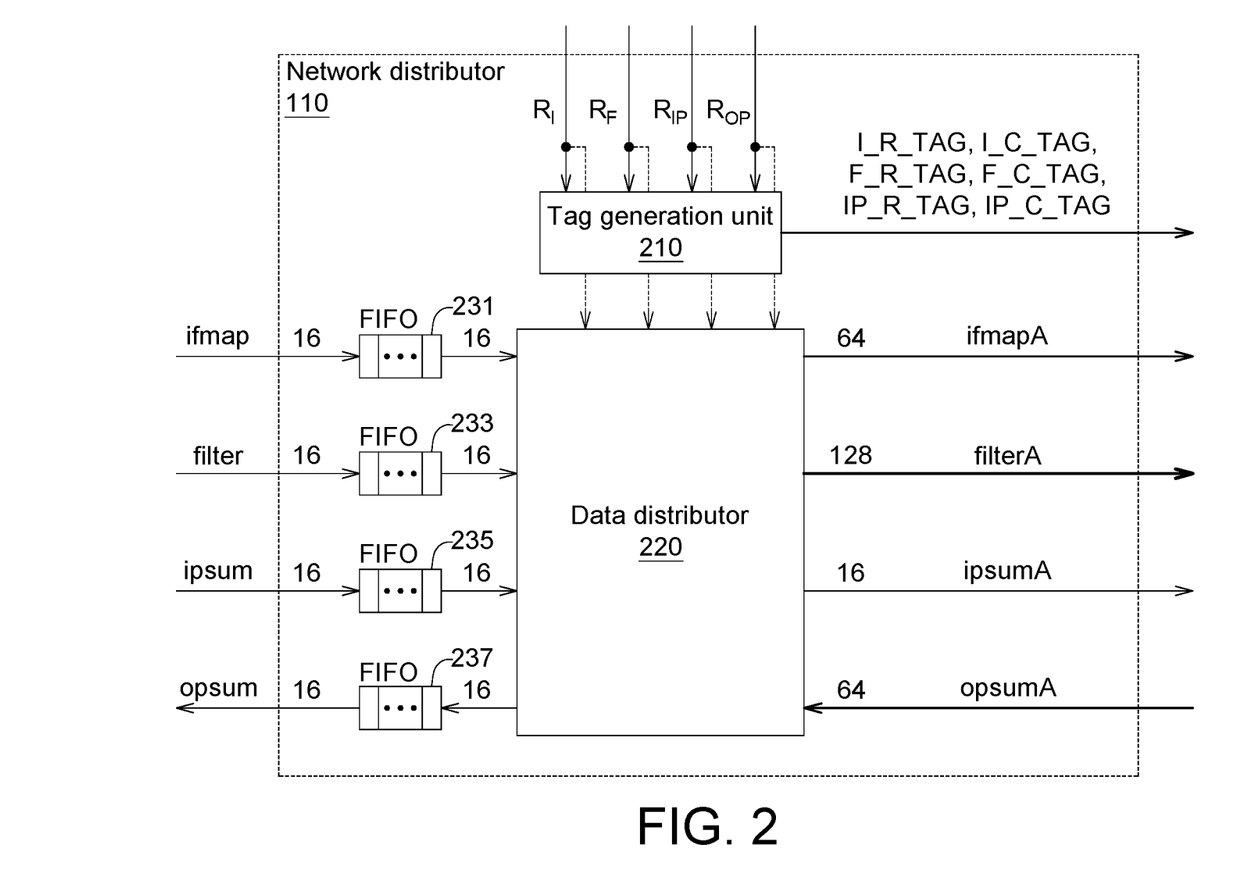
FIG. 2 is a function block diagram of a network distributor according to according to an embodiment of the present application.

Refer to FIG. 2 showing a function block diagram of the network distributor 110 according to an embodiment of the present application. As shown in FIG. 2, the network distributor 110 includes a tag generation unit 210, a data distributor 220 and a plurality of first-in-first-out (FIFO) buffers 231, 233, 235 and 237.

The tag generation unit 210 generates a plurality of first tags and a plurality of second tags according to the bandwidth proportions $R_I$, $R_F$, $R_{IP}$, and $R_{OP}$. The first tags are exemplified by row tags I_R_TAG, F_R_TAG, and IP_R_TAG, and the second tags are exemplified by a plurality of column tags I_C_TAG, F_C_TAG and IP_C_TAG herein; however, the present application is not limited to these examples. I_R_TAG and I_C_TAG respectively represent the row tag and the column tag of the data ifmap, F_R_TAG and F_C_TAG respectively represent the row tag and the column tag of the data filter, and IP_R_TAG and IP_C_TAG respectively represent the row tag and the column tag of the data ipsum.

The processing elements 122 determine, according to the row tags and the column tags, whether to process a set of data. The details are described below.

The data distributor 220, coupled to the tag generation unit 210, receives the data (ifmap, filter and ipsum) sent from the FIFO buffers 231, 233, and 235, and/or sends data (opsum) to the FIFO buffer 237, and allocates transmission bandwidths for the data (ifmap, filter, ipsum and opsum) according to the bandwidth proportions $R_I$, $R_F$, $R_{IP}$ and/or $R_{OP}$, allowing the data to be communicated between the network distributor 110 and the processing element array 120 according to the transmission bandwidths allocated.

The FIFO buffers 231, 233, 235 and 237 are for respectively buffering the data ifmap, filter, ipsum and opsum.

In one embodiment of the present application, the network distributor 110 receives the input data ifmap, filter and ipsum by using a 16-bit bandwidth, and also outputs the output data opsum by using a 16-bit bandwidth (the total input transmission bandwidth of the input data inputted to the network distributor 110 is fixed, and the total output transmission bandwidth of the output data outputted from the network distributor 110 is fixed). For a particular data layer, with respect to the input data processed by the data distributor 220 (e.g., collecting eight sets of 16-bit data into 128-bit data, or separating 64-bit data into four sets of 16-bit data), the data distributor 220 transmits data ifmapA to the processing element array 120 by using a 64-bit bandwidth, data filterA to the processing element array 120 by using a 128-bit bandwidth and data ipsumA to the processing element array 120 by using a 16-bit bandwidth, and receives data opsumA returned from the processing element array 120 by using a 64-bit bandwidth. Thus, data is more efficiently communicated between the network distributor 110 and the processing element array 120. That is, if the data filter occupies a higher proportion, the data filterA is transmitted to the processing element array 120 by using a higher-bit bandwidth; if data the ifmap occupies a higher proportion, the data ifmapA is transmitted to the processing element array 120 by using a higher-bit bandwidth.

Figure 3:
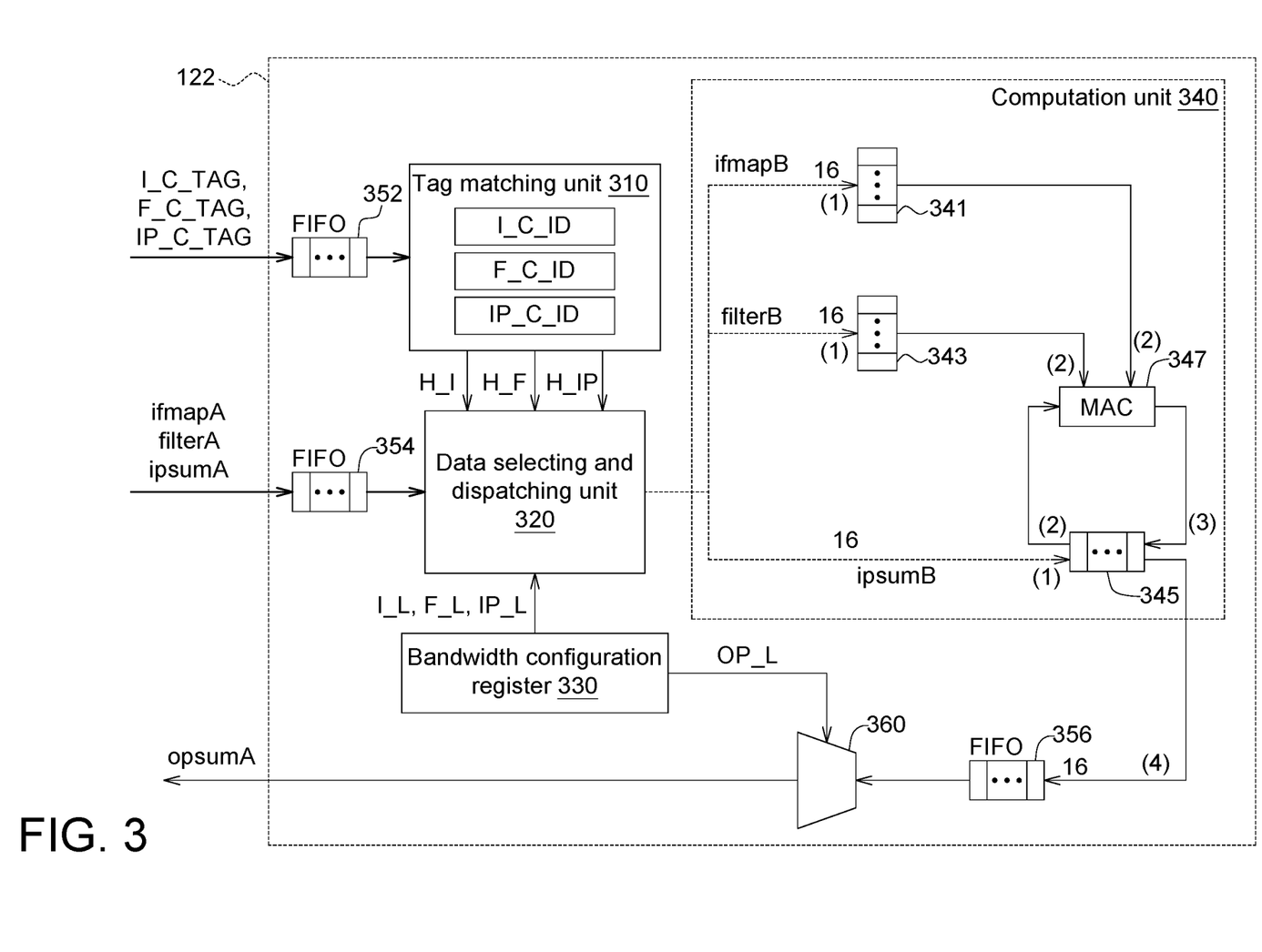
FIG. 3 is a function block diagram of a processing element according to an embodiment of the present application.

Refer to FIG. 3 showing a function block diagram of a processing element 122 according to an embodiment of the present application. As shown in FIG. 3, the processing element 122 includes a tag matching unit 310, a data selecting and dispatching unit 320, a bandwidth configuration register 330, a computation unit 340, FIFO buffers 352, 354 and 356, and a reshaper 360.

In one embodiment of the present application, the processing element array 120 further optionally includes a row decoder (not shown), which is for decoding the row tags I_R_TAG, F_R_TAG and IP_R_TAG generated by the tag generation unit 210 to determine which row is to receive the corresponding set of data. More specifically, assuming that the processing element array 120 includes 12 rows of processing elements, if the row tags I_R_TAG, R_F_TAG and IP_R_TAG point to the first row (e.g., the values of I_R_TAG, R_F_TAG and IP_R_TAG are all 1), the row decoder forwards a decoded set of data therefrom after decoding to the first row, and so forth.

The tag matching unit 310 is for matching the column tags I_C_TAG, F_C_TAG and IP_C_TAG generated by the tag generation unit 210 and column identifiers (col. ID) I_C_ID, F_C_ID and IP_C_ID to determine whether the processing elements are to process the corresponding set of data. More specifically, assume that each row of the processing element array 120 includes 14 processing elements. For the first processing element, the column identifiers I_C_ID, F_C_ID and IP_C_ID are all 1 (similar for the remaining processing elements and the corresponding column identifiers). If the values of the column tags I_C_TAG, F_C_TAG and IP_C_TAG are all 1, after the matching performed by the tag matching unit 310, the first processing element determines to process the corresponding set of data. In one embodiment, according to a matching result of the tag matching unit 310, the tag matching unit 310 generates a plurality of hit parameters H_I, H_F and H_IP. If the hit parameter H_I, H_F or H_IP is logic high, it means the matching is successful; if the hit parameter H_I, H_F or H_IP is logic low, it means that the matching has failed. The data selecting and dispatching unit 320 can determine, according to the hit parameters H_I, H_F and H_IP, whether to process the corresponding set of data. If the hit parameter H_I is logic high, the data selecting and dispatching unit 320 processes the set of data ifmapA; if the hit parameter H_F is logic high, the data selecting and dispatching unit 320 processes the set of data filterA; if the hit parameter H_IP is logic high, the data selecting and dispatching unit 320 processes the set of data ipsumA.

The bandwidth configuration register 330 stores a plurality of bandwidth configuration parameters I_L, F_L, IP_L and OP_L corresponding to the data types ifmapA, filterA, ipsumA and opsum, wherein the bandwidth configuration parameters I_L, F_L, IP_L and OP_L (the unit of transmission bandwidths is, for example, bit) respectively represent transmission bandwidths allocated to the data ifmapA, filterA, ipsumA and opsumA by the data distributor 220 of the network distributor 110.

The data selecting and dispatching unit 320 selects data from the FIFO buffer 354 according to the bandwidth configuration parameters I_L, F_L and IP_L sent from the bandwidth configuration register 330 and the hit parameters H_I, H_F and H_IP sent from the tag matching unit 310, so as to form data ifmapB, filterB and ipsumB, wherein the bit count of each set of the data ifmapB, filterB and ipsumB formed by the data selecting and dispatching unit 320 is assumed to be 16-bit. That is, it is assumed that the bit counts of ifmapA, filterA and ipsumA sent from the data distributor 220 are respectively 64-bit, 128 bits and 16-bit (as shown in FIG. 2), and after the reshaping of the data selecting and dispatching unit 320, each set of data ifmapB, filterB and ipsumB is 16-bit.

The computation unit 340 includes an internal scratch pad memories (sped) 341, 343 and 345 and a multiply accumulate (MAC) 347, and is, for example but not limited to, a multiply accumulate operation unit. In one embodiment of the present application, the data ifmapB, filterB and ipsumB (e.g., each being 16-bit) formed by the data selecting and dispatching unit 320 is placed in the internal scratch pad memories 341, 343 and 345 (as indicated by (1)). Next, the multiply accumulate 347 performs multiplication and accumulation; that is, the multiply accumulate 347 performs multiplication on data ifmapB and filterB to obtain a multiplication result, and then performs accumulation on the multiplication result and the value in the internal scratch pad memory 345 (as indicated by (2)). The value obtained from the above multiplication and accumulation is then written in the internal scratch pad memory 345 and is later to be used for accumulation. After that, (2) and (3) are cyclically performed. When the input data placed in the internal scratch pad memories 341 and 343 has been completed the computation and corresponding opsum has been generated, the value of opsum is outputted from the internal scratch pad memory 345 to the FIFO buffer 356 (as indicated by (4)). Thus, the multiplication and accumulation operation is completed. It should be noted that, the above is an example for illustration purposes, and the present application is not limited thereto. In other embodiments of the present application, the computation unit 340 can designed to perform other operations according to requirements, and the components of computation unit 340 are adjusted accordingly—such are all within the scope of the spirit of the present application.

The FIFO buffer 352 buffers and outputs the column tags I_C_TAG, F_C_TAG and IP_C_TAG to the tag matching unit 310. The FIFO buffer 354 buffers and outputs the data ifmapA, filterA and ipsumA to the data selecting and dispatching unit 320. The FIFO buffer 356 buffers and outputs the data generated by the computation unit 340 to the reshaper 360.

The reshaper 360 reshapes the data sent from the FIFO buffer 356, according to the bandwidth configuration parameter OP_L, into the data opsumA (e.g., if the output data opsumA is 64-bit and the data sent from the FIFO buffer 356 is 16-bit, the data of four sets of 16-bit data is reshaped into one set of 64-bit data), and returns the data opsumA to the data distributor 220 of the network distributor 120, so as to write the data opsumA into the FIFO 237 and return the data opsumA to the memory.

In one embodiment of the present application, the data inputted to the network distributor 110 may be from an internal buffer (not shown) of the DNN hardware accelerator 100, wherein the internal buffer may be directly coupled to the network distributor 110. Alternatively, in one possible embodiment of the present application, the data inputted to the network distributor 110 may be from a memory (not shown) connected through a system bus (not shown); that is, the memory may be coupled to the network distributor 110 through a system bus.

Figure 4:
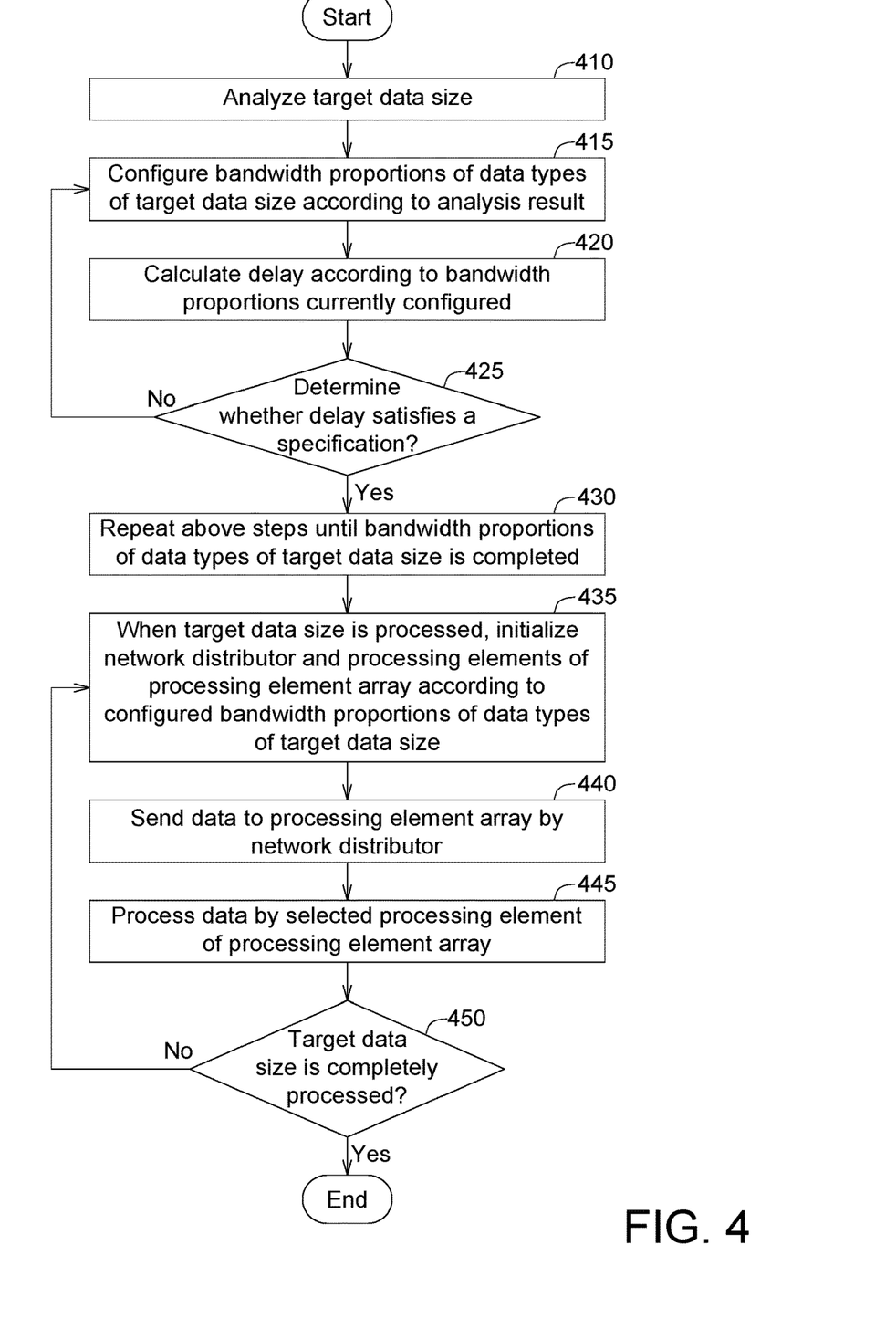
FIG. 4 is a flowchart of an operation method for a DNN hardware accelerator according to an embodiment of the present application.

FIG. 4 shows a flowchart of an operation method for a DNN hardware accelerator 100 according to an embodiment of the present application. As shown in FIG. 4, in step 410, a target data size is analyzed. In step 415, bandwidth proportions ($R_I$, $R_F$, $R_{IF}$ and $R_{OP}$) of a plurality of data types are configured according to the analysis result of the target data size. In step 420, a delay is calculated according to the bandwidth proportions ($R_I$, $R_F$, $R_{IF}$ and $R_{OP}$) current configured. In step 425, it is determined whether the delay satisfies a specification; that is, it is determined whether the delay caused by the bandwidth proportions ($R_I$, $R_F$, $R_{IF}$ and $R_{OP}$) currently configured satisfies a specification. If a result of step 425 is negative, the process returns to step 415 to again configure the bandwidth proportions ($R_I$, $R_F$, $R_{IF}$ and $R_{OP}$) of the data types. If the result of step 425 is affirmative, the above steps are repeated until the configuration of the bandwidth proportions ($R_I$, $R_F$, $R_{IF}$ and $R_{OP}$) of the data types of the target data size is completed (step 430). In one embodiment, step 435 can be performed after performing steps 410 to 425 on one data layer. In one embodiment, steps 410 to 425 can be performed on more than one data layer or all data layers concurrently (e.g., parallel processing). In one embodiment of the present application, steps 410 to 430 can be dynamically/real-time performed by a microprocessor. In one embodiment of the present application, steps 410 to 430 can be achieved offline.

In step 435, when the target data size is processed, the network distributor 110 and the processing elements 122 of the processing element array 120 are initialized according to the bandwidth proportions ($R_I$, $R_F$, $R_{IF}$ and $R_{OP}$) of the data types of the target data size. In one embodiment, with respect to the bandwidth proportions ($R_I$, $R_F$, $R_{IF}$ and $R_{OP}$) of the target data size, the transmission bandwidths of the data types are adjusted/allocated by the network distributor 110; and bandwidth configuration parameters I_L, F_L, IP_L and OP_L are written into the processing elements 122. In one embodiment, for the target data size, the bandwidth proportions ($R_I$, $R_F$, $R_{IF}$ and $R_{OP}$) stored in the bandwidth parameter register are written into the tag generation unit 210 and/or the data distributor 220, and the column identifiers IC_ID, F_C_ID and IP_C_ID of the tag matching unit 310 and/or the bandwidth configuration parameters I_L, F_L, IP_L and OP_L of the bandwidth configuration register 330 in the processing elements 122 are configured. In step 440, the data (ifmap, filter and ipsum) is forwarded by the network distributor 110 to the processing element array 120. In step 445, the data is processed by one or more selected processing elements 122 of the processing element array 120. In step 450, it is determined whether the target data size is completely processed. If a result of step 450 is negative, the process returns to step 435, and steps 435 to 445 are repeated until the target data size is completely processed. If the result of step 450 is affirmative, it means the processing is completed.

Figure 5:
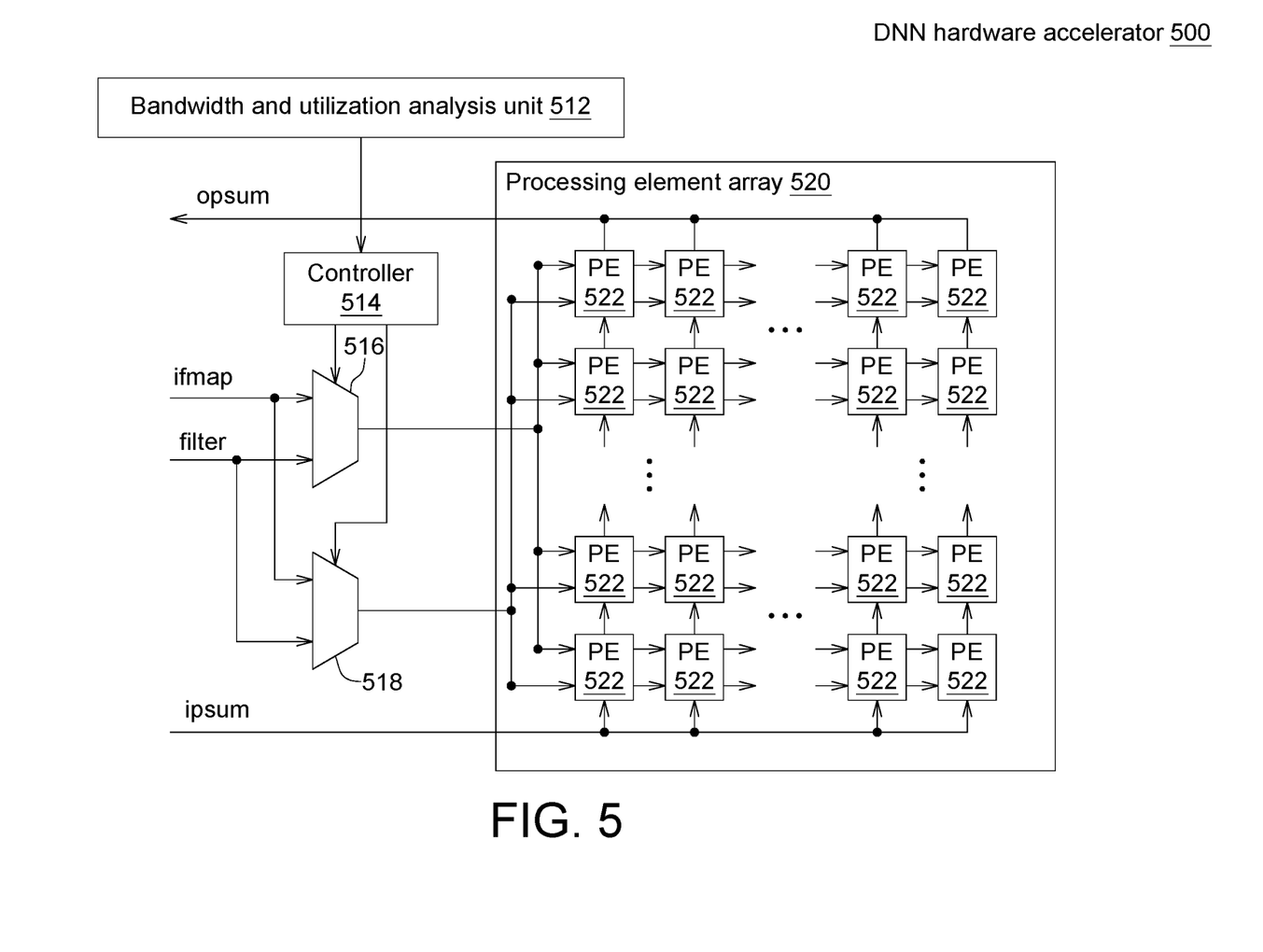
FIG. 5 is a function block diagram of a DNN hardware accelerator according to an embodiment of the present application.

Refer to FIG. 5 showing a function block diagram of a DNN hardware accelerator according to an embodiment of the present application. As shown in FIG. 5, a DNN hardware accelerator 500 at least includes a bandwidth and utilization analysis unit 512, a controller 514, multiplexers 516 and 518, and a processing element array 520. The processing element array 520 includes a plurality of processing elements 522.

The bandwidth and utilization analysis unit 512 performs profiling on a target data size. Herein, the target data size may be a plurality of data layers, at least one data layer or a configured data size. Similarly, the target data size is exemplified by a plurality of data layers in the description below;

however, the present application is not limited to such example. The bandwidth and utilization analysis unit 512 performs profiling on the data layers to obtain a distribution situation of data types of the data layers. Thus, the bandwidth and utilization analysis unit 512 can accordingly obtain appropriate transmission bandwidths for the data types. In one embodiment, the bandwidth and utilization analysis unit 512 can obtain the distribution situation of the data types of the data layers according to bandwidth proportions ($R_I$, $R_F$, $R_{IF}$ and $R_{OP}$) of the data layers. In one embodiment, the network distributor 110 includes the bandwidth and utilization analysis unit 512.

The controller 514 is coupled to the bandwidth and utilization analysis unit 512 and the multiplexers 516 and 518. The controller 514 controls the multiplexers 516 and 518 according to the appropriate transmission bandwidths configured by the bandwidth and utilization analysis unit 512 with respect to the data types.

The multiplexers 516 and 518 are coupled to the processing element array 520. Both of the multiplexers 516 and 518 receive the data ifmap and filter. In the embodiment in FIG. 5 of the present application, the output bandwidth (assumed to be 16-bit but not limited thereto) of the multiplexer 516 is smaller than the output bandwidth (assumed to be 64-bit but not limited thereto) of the multiplexer 518.

An example is given below. Assume that bit number of the data ifmap and filter forwarded to the multiplexers 516 and 518 are respectively 64-bit and 16-bit. For a particular data layer, after the profiling performed by the bandwidth and utilization analysis unit 512, the data size of the data ifmap is greater than that of the data filter. Therefore, under the control of the controller 514, the multiplexer 516 (having a smaller output bandwidth) chooses to output the data filter having a smaller data size to the processing element array 520, and the multiplexer 518 (having a greater output bandwidth) chooses to output the data ifmap having a larger data size to the processing element array 520.

Similarly, for another data layer, after the profiling performed by the bandwidth and utilization analysis unit 512, the data size of the data ifmap is smaller than that of the data filter. Therefore, under the control of the controller 514, the multiplexer 516 chooses to output the data ifmap having a smaller data size to the processing element array 520, and the multiplexer 518 chooses to output the data filter having a larger data size to the processing element array 520.

That is, under the control of the controller 514, the multiplexer 516 is limited to outputting one having a smaller data size between the data ifmap and filter of the input data to the processing element array 520, and the multiplexer 518 is limited to outputting the one having a larger data size between the data ifmap and filter of the input data to the processing element array 520.

Using the above method, the data type requiring a larger data size can be sent to the processing element array 520 by using a larger bandwidth, so as to improve processing efficiency.

Figure 6:
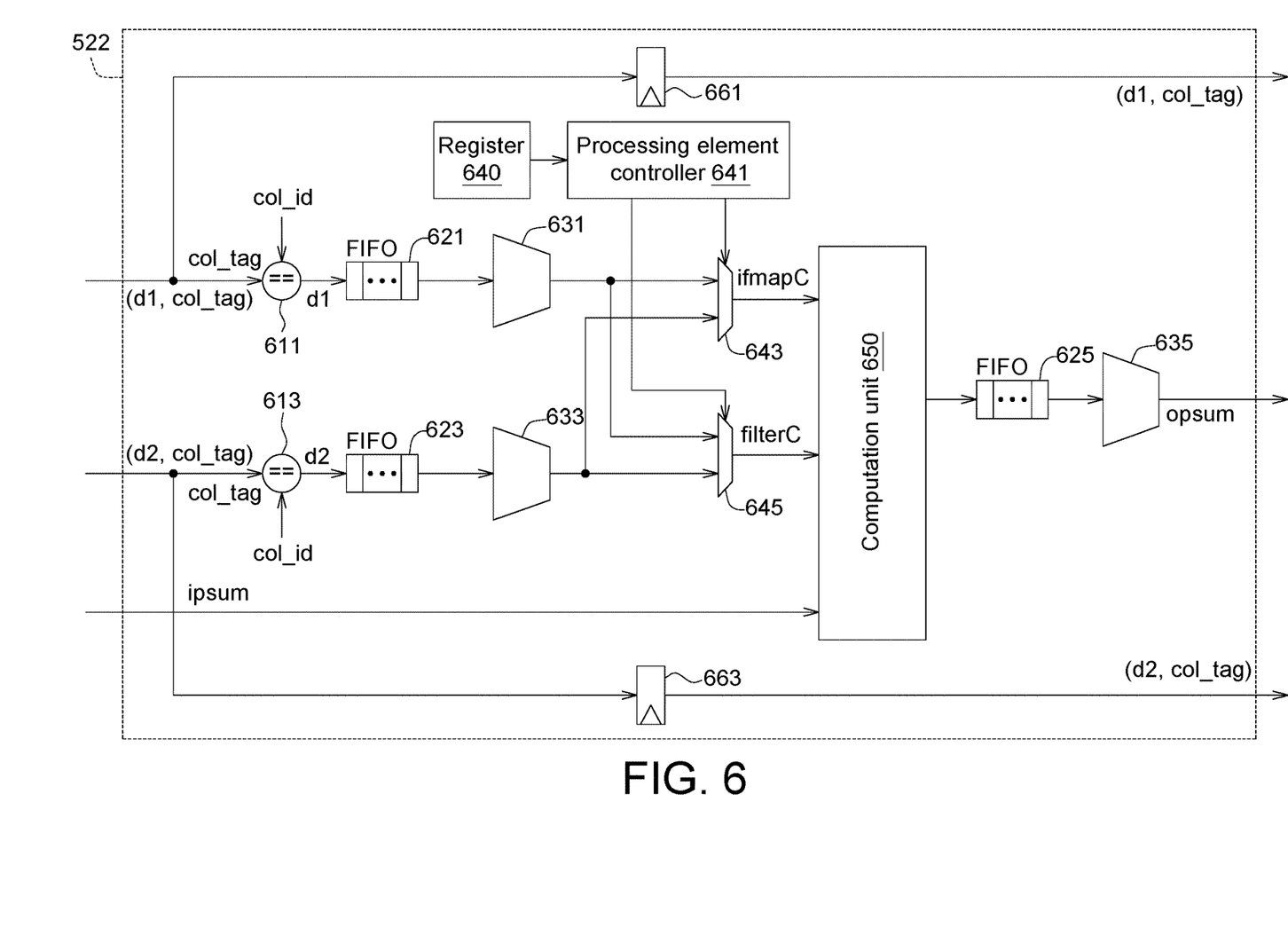
FIG. 6 is a function block diagram of a processing element according to an embodiment of the present application.

Refer to FIG. 6 showing a function block diagram of a processing element 522 according to the embodiment in FIG. 5 of the present application. The processing element 522 includes matching units 611 and 613, FIFO buffers 621, 623 and 625, reshapers 631, 633 and 635, a register 640, a processing element controller 641, multiplexers 643 and 645, a computation unit 650, and buffer units 661 and 663.

The matching units 611 and 613 match a column tag col_tag of data 1 d1 and a column tag col_tag of data 2 d2 with a column identifier col_id, wherein the set of data 1 d1 and the set of data 2 d2 are respectively one and the other of the data ifmap and filter. Alternatively, the data 1 d1 is sent from the multiplexer 516, whereas the data 2 d2 is sent from the multiplexer 518. If the column tag col_tag matches the column identifier col_id, it means that the set of data is required to be processed by the processing element 522. Thus, the set of data 1 d1 and the set of data 2 d2 are respectively inputted to the FIFO buffers 621 and 623. Conversely, if the column tag col_tag does not match the column identifier col_id, it means that the set of data is not to be processed by the processing element 522, and the set of data 1 d1 and the set of data 2 d2 are not required to be inputted to the FIFO buffers 621 and 623. In one embodiment, the data 1 d1 is from the multiplexer 516 in FIG. 5, and the data 2 d2 is from the multiplexer 518 in FIG. 5; the data 1 d1 is 16-bit, and the data 2 d2 is 64-bit.

The reshapers 631 and 633 are coupled to the FIFO buffers 621 and 623 and the multiplexers 643 and 645. The reshapers 631 and 633 reshape the output data, which is from the FIFO buffers 621 and 633, and input the reshaped data to the multiplexers 643 and 645. The reshapers can reshape data having a large bit count into data having a small bit count or data having a small bit count into data having a large bit count. For example, assuming that the data 2 d2 is 64-bit, after the data 2 d2 is stored into the FIFO buffer 623 and then outputted as 64-bit to the reshaper 633, the reshaper 633 reshapes the 64-bit data into 16-bit data that is then outputted to the 16-bit multiplexers 643 and multiplexer 645. Assuming that the data 1 d1 is 16-bit, after the data 1 d1 is stored into the FIFO buffer 621 and outputted as 16-bit to the reshaper 631, the reshaper 631 reshapes the 16-bit data into 16-bit data that is then outputted to the 16-bit multiplexer 643 and multiplexer 645. In one embodiment, if bit counts of the data inputted to the processing element 522 and the data inputted to the computation unit 650 are the same, the reshaper can be omitted. For example, if the data 1 d1 is 16-bit, the data 2 d2 is 64-bit and the data inputted to the computation unit is 16-bit, the reshaper 631 can be omitted.

The processing element controller 641 is coupled to the register 640 and the multiplexers 643 and 645, and controls the multiplexers 643 and 645 according to the bandwidth configuration parameters I_L and F_L buffered in the register 640. More specifically, if the bandwidth configuration parameters I_L and F_L indicate that the transmission bandwidth of the data ifmap is smaller than the transmission bandwidth of the data filter, under the control of the control element controller 641, the multiplexer 643 chooses to output the data 1 d1 (the data sent from the multiplexer 516 having a smaller transmission bandwidth) as the data ifmapC, and the multiplexer 645 chooses to output the data 2 d2 (the data sent from the multiplexer 518 having a larger transmission bandwidth) as the data filter.

Conversely, if the bandwidth configuration parameters I_L and F_L indicate that the transmission bandwidth of the data ifmap is larger than the transmission bandwidth of the data filter, under the control of the processing element controller 641, the multiplexer 643 chooses to output the data 2 d2 (data sent from the multiplexer 518 having a larger transmission bandwidth) as the data ifmapC, and the multiplexer 645 chooses to output the data 1 d1 (the data sent from the multiplexer 516 having a smaller transmission bandwidth) as the data filterC.

The computation unit 650 is coupled to the multiplexers 643 and 645. The constitution and operations of the computation unit 650 are in principle similar or identical to those of the computation unit 340 in FIG. 3, and thus associated details are omitted herein.

The FIFO buffer 625 is coupled to the computation unit 650 and the reshaper 635, and buffers the data generated by the computation unit 650. The reshaper 635 reshapes the data sent from the FIFO buffer 625 into data opsum (the data opsum can be forwarded to the next-stage processing element 522 for accumulation, and then forwarded by the last-stage processing element 522 (e.g. the rightmost processing element 522 in FIG. 5) to the outside of the DNN hardware accelerator 500).

The buffer units 661 and 663 buffer the data 1 and the column tag (d1, col_tag) thereof as well as the data 2 and the column tag (d2, col_tag) thereof forwarded from the previous-stage processing element 522, and forward the same to the next-stage processing element 522. The buffer units 661 and 663 are implemented by, for example, registers.

Figure 7:
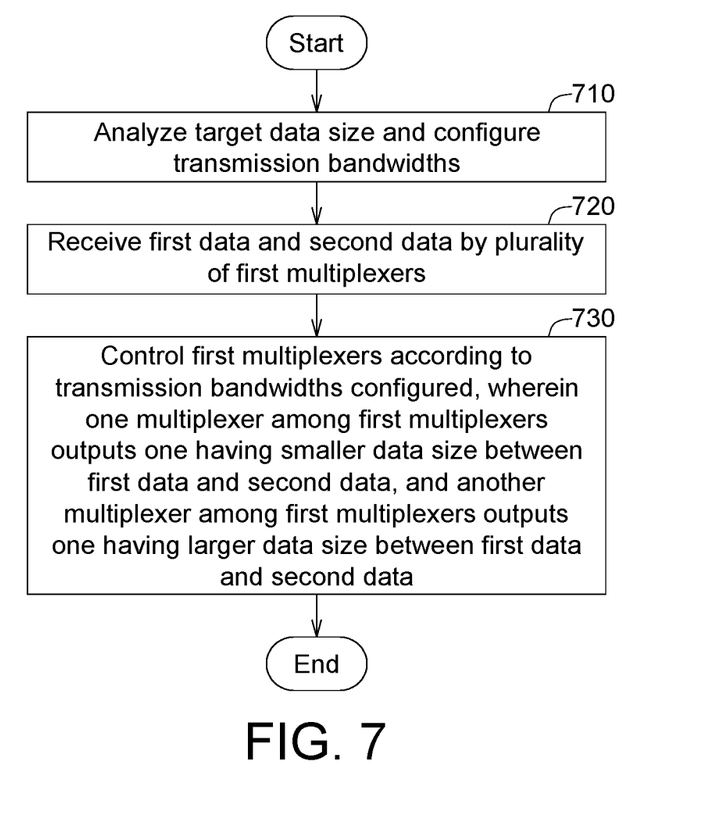
FIG. 7 is a flowchart of an operation method for a DNN hardware accelerator according to an embodiment of the present application.

FIG. 7 shows an operation method for a DNN hardware accelerator according to an embodiment of the present application. The operation method includes: analyzing a target data size (step 710) to obtain a distribution situation of a plurality of data types of the target data size, and configuring individual transmission bandwidths for the data types of the target data size; receiving first data and second data of input data from a plurality of first multiplexers (step 720); and controlling the first multiplexers according to the transmission bandwidths configured for the data types (step 730). A multiplexer among the first multiplexers outputs one having a smaller data size between the first data and the second data of the input data to a processing element array of the DNN hardware accelerator for processing, and another multiplexer among the first multiplexers outputs one having a larger data size between the first data and the second data of the input data to the processing element array for processing. Details of steps 710 to 730 can be referred from the description of FIG. 5 and FIG. 6, and associated details are omitted herein.

In one embodiment of the present application, for the same data layer, the same bandwidth allocation and bandwidth proportions or different bandwidth allocation and bandwidth proportions can be used; for example, the bandwidth allocation and bandwidth proportions can be dynamically adjusted, with associated details omitted herein. It should be noted that the above is also encompassed within the scope of the spirit of the present application. In one embodiment of the present application, different bandwidth allocation and bandwidth proportions or the same bandwidth allocation and bandwidth proportions can be used for different data layers.

The embodiments of the present application can be applied to an artificial intelligence (AI) accelerator of a terminal device (for example but not limited to, a smartphone) and can also be applied to a device such as a server.

It is known from the above that, in the two foregoing embodiments of the present application, by analyzing, in an offline or real-time manner, a distribution situation of data types of data layers, a data type requiring a larger data size can be inputted to a processing element array by using a larger bandwidth, thereby allowing the processing element array to more efficiently obtain input data needed for computation and reducing idleness of the processing element array caused by a waiting period for input data.

While the invention has been described and illustrated with reference to embodiments thereof, these descriptions and illustrations do not limit the invention. It should be understood by those skilled in the art that various changes and modifications may be made without departing from the true spirit and scope of the invention. The scope of the invention is defined by the appended claims.

What is claimed is:

1. A deep neural network (DNN) hardware accelerator, comprising:
   a network distributor, receiving input data, allocating individual bandwidths for a plurality of data types of a target data size according to a plurality of bandwidth proportions of the target data size;
   a processing element array, coupled to the network distributor, communicating respective data of the data types of the target data size with the network distributor according to the individual bandwidths allocated for the data types; and
   a bandwidth parameter register, coupled to the network distributor, storing the bandwidth proportions of the target data size, and sending the bandwidth proportions of the target data size to the network distributor;
   wherein, the target data size comprises a plurality of data layers, at least one data layer or a configured data size.

2. The DNN hardware accelerator according to claim 1, wherein the bandwidth proportions of the target data size are obtained from dynamically analyzing the target data size by a microprocessor and sent to the network distributor.

3. The DNN hardware accelerator according to claim 1, wherein the bandwidth proportions of the target data size are associated with individual weights of the data types of the target data size.

4. The DNN hardware accelerator according to claim 1, wherein the network distributor comprises:
   a tag generation unit, generating a plurality of first tags and a plurality of second tags according to the bandwidth proportions; and
   a data distributor, receiving the input data and allocating the individual bandwidths for the data types of the target data size according to the bandwidth proportions.

5. The DNN hardware accelerator according to claim 4, wherein the processing element array comprises a plurality of processing elements arranged in an array, and each of the processing elements comprises:
   a tag matching unit, matching the second tags with a plurality of first identifiers to generate a plurality of hit parameters;
   a bandwidth configuration register, storing a plurality of bandwidth configuration parameters corresponding to the data types;
   a data selecting and dispatching unit, coupled to the tag matching unit and the bandwidth configuration register, reshaping, according to the hit parameters and the bandwidth configuration parameters, the data sent from the network distributor; and
   a computation unit, coupled to the data selecting and dispatching unit, computing the data reshaped by the data selecting and dispatching unit.

6. The DNN hardware accelerator according to claim 1, wherein the input data received by the network distributor is from a buffer or from a memory connected through a system bus.

7. The DNN hardware accelerator according to claim 1, wherein when the target data size comprises a plurality of data layers, the data layers have different bandwidth proportions, and the network distributor allocates different individual bandwidths for the data layers.

8. The DNN hardware accelerator according to claim 1, wherein when the target data size comprises a plurality of data layers, the data layers have the same bandwidth proportions, and the network distributor allocates the same individual bandwidths for the data layers.

9. An operation method for a deep neural network (DNN) hardware accelerator, the DNN hardware accelerator comprising a network distributor and a processing element array, the processing element array comprising a plurality of processing elements, the operation method comprising:
   analyzing a target data size;
   configuring a plurality of bandwidth proportions of a plurality of data types of the target data size according to an analysis result of the target data size;
   determining, according to a delay caused in association with the bandwidth proportions of the data types of the target data size, whether to reconfigure the bandwidth proportions of the data types of the target data size;
   initializing the network distributor and the processing elements of the processing element array according to the bandwidth proportions of the data types of the target data size; and
   processing input data by at least one selected processing elements of the processing element array.

10. The operation method according to claim 9, wherein the step of analyzing, the step of configuring the bandwidth proportions and the step of determining are dynamically performed by a microprocessor.

11. The operation method according to claim 9, wherein the step of analyzing, the step of configuring the bandwidth proportions and the step of determining are achieved in an offline manner.

12. The operation method according to claim 9, wherein the step of initializing the network distributor and the processing elements of the processing element array comprises:
    adjusting or allocating individual transmission bandwidths for the data types by the network distributor according to the bandwidth proportions of the data types of the target data size; and
    writing a plurality of bandwidth configuration parameters associated with the bandwidth proportions into the processing elements.

13. The operation method according to claim 9, wherein when the target data size comprises a plurality of data layers, different bandwidth proportions are configured for the data layers.

14. The operation method according to claim 9, wherein when the target data size comprises a plurality of data layers, the same bandwidth proportions are configured for the data layers.

15. A deep neural network (DNN) hardware accelerator, comprising:
    a bandwidth and utilization analysis unit, analyzing a target data size to obtain a distribution situation of a plurality of data types of the target data size, and configuring individual transmission bandwidths for the data types of the target data size;
    a processing element array, comprising a plurality of processing elements;
    a plurality of first multiplexers, coupled to the processing element array, the first multiplexers receiving first data and second data of input data; and
    a controller, coupled to the bandwidth and utilization analysis unit and the first multiplexers, the controller controlling the multiplexers according to the transmission bandwidths configured for the data types by the bandwidth and utilization analysis unit;
    wherein, a multiplexer among the first multiplexers outputs one having a smaller data size between the first data and the second data of the input data to the processing element array, and another multiplexer among the first multiplexers outputs one having a larger data size between the first data and the second data of the input data to the processing element array.

16. The DNN hardware accelerator according to claim 15, wherein each of the processing elements comprises:
    a plurality of matching units, matching a column tag of the first data and the second data with a column identifier to determine whether to process the first data and the second data;
    a register, buffering a bandwidth configuration parameter;
    a processing element controller, coupled to the register, receiving the bandwidth configuration parameter sent from the register;
    a plurality of second multiplexers, coupled to the processing element controller, the processing element controller controlling the second multiplexers according to the bandwidth configuration parameter sent from the register, the second multiplexers receiving the first data and the second data; and
    a computation unit, coupled to the second multiplexers, the second multiplexers outputting the first data and the second data for computation.

17. The DNN hardware accelerator according to claim 15, wherein when the target data size comprises a plurality of data layers, the bandwidth and utilization analysis unit configures different individual transmission bandwidths for the data layers.

18. The DNN hardware accelerator according to claim 15, wherein when the target data size comprises a plurality of data layers, the bandwidth and utilization analysis unit configures the same individual transmission bandwidths for the data layers.

19. An operation method for a deep neural network (DNN) hardware accelerator, the DNN hardware accelerator comprising a network distributor and a processing element array, the operation method comprising:
    receiving input data, allocating individual bandwidths for a plurality of data types of a target data size according to a plurality of bandwidth proportions of the target data size;
    communicating respective data of the data types between the processing element array and the network distributor according to the individual bandwidths allocated for the data types; and
    storing the bandwidth proportions of the target data size, and sending the bandwidth proportions of the target data size to the network distributor;
    wherein, the target data size comprises a plurality of data layers, at least one data layer or a configured data size.

20. The operation method according to claim 19, wherein the bandwidth proportions of the target data size are obtained by dynamically analyzing the target data size and are sent to the network distributor.

21. The operation method according to claim 19, wherein the bandwidth proportions of the target data size are associated with individual weights of the data types of the target data size.

22. The operation method according to claim 19, further comprising:
    generating a plurality of first tags and a plurality of second tags according to the bandwidth proportions; and
    receiving the input data, and allocating the individual bandwidths for the data types of the target data size according to the bandwidth proportions.

23. The operation method according to claim 22, wherein the processing element array comprises a plurality of processing elements arranged in an array, the operation method further comprising:
    matching the second tags with a plurality of first identifiers to generate a plurality of hit parameters;
    storing a plurality of bandwidth configuration parameters corresponding to the data types;
    reshaping, according to the hit parameters and the bandwidth configuration parameters, the data sent from the network distributor; and
    performing computation on the reshaped data.

24. The operation method according to claim 19, wherein the input data received by the network distributor is from a buffer or from a memory connected through a system bus.

* * * * *